(12) United States Patent
Budd

(10) Patent No.: US 11,655,179 B2
(45) Date of Patent: May 23, 2023

(54) SEALING COMPOSITIONS

(71) Applicant: COORSTEK MEMBRANE SCIENCES AS, Oslo (NO)

(72) Inventor: Michael Ian Budd, Oslo (NO)

(73) Assignee: COORSTEK MEMBRANE SCIENCES AS, Oslo (NO)

( * ) Notice: Subject to any disclaimer, the term of this patent is extended or adjusted under 35 U.S.C. 154(b) by 0 days.

(21) Appl. No.: 16/955,452

(22) PCT Filed: Dec. 19, 2018

(86) PCT No.: PCT/EP2018/085958
§ 371 (c)(1),
(2) Date: Jun. 18, 2020

(87) PCT Pub. No.: WO2019/121992
PCT Pub. Date: Jun. 27, 2019

(65) Prior Publication Data
US 2020/0369558 A1 Nov. 26, 2020

(30) Foreign Application Priority Data
Dec. 19, 2017 (GB) ...................... 1721319

(51) Int. Cl.
*C03C 8/24* (2006.01)
*C03C 10/04* (2006.01)
(Continued)

(52) U.S. Cl.
CPC .............. *C03C 3/078* (2013.01); *C03C 3/062* (2013.01); *C03C 10/0009* (2013.01); *C03C 12/00* (2013.01); *C25B 9/19* (2021.01)

(58) Field of Classification Search
CPC .............................. C03C 8/24; C03C 10/0009
See application file for complete search history.

(56) References Cited

U.S. PATENT DOCUMENTS 4,783,429 A * 11/1988 Shibuya ................. A61K 6/807
501/59
4,853,349 A 8/1989 Martin
(Continued)

FOREIGN PATENT DOCUMENTS

| CN | 101072676 A | 11/2007 |
|---|---|---|
| CN | 103373813 A | 10/2013 |

(Continued)

OTHER PUBLICATIONS

International Search Report from PCT/EP2018/085958 dated Apr. 10, 2019.
(Continued)

*Primary Examiner* — Karl E Group
(74) *Attorney, Agent, or Firm* — Thomas | Horstemeyer, LLP

(57) ABSTRACT

The present invention relates to compositions in the form of precursor glass powders, pastes and preforms comprising said precursor glass powders and glass-ceramics produced from the precursor glass powders, pastes or preforms. The present invention also relates to a method of forming a seal between a first and second material with a glass-ceramic, and a joint comprising a first material, a second material and a glass-ceramic sealing material joining the first and second materials together.

17 Claims, 4 Drawing Sheets

(51) Int. Cl.
*C03C 3/078* (2006.01)
*C03C 3/062* (2006.01)
*C03C 10/00* (2006.01)
*C03C 12/00* (2006.01)
*C25B 9/19* (2021.01)

(56) References Cited

U.S. PATENT DOCUMENTS

| | | | | |
|---|---|---|---|---|
| 6,270,880 | B1* | 8/2001 | Kawakami | H01L 23/49894 |
| | | | | 428/210 |
| 6,649,550 | B2* | 11/2003 | Umayahara | C03C 14/004 |
| | | | | 428/210 |
| 7,470,640 | B2* | 12/2008 | Badding | C03C 3/087 |
| | | | | 501/15 |
| 8,178,453 | B2* | 5/2012 | Tanida | C03C 3/087 |
| | | | | 501/15 |
| 9,487,433 | B2* | 11/2016 | Maeda | C03C 3/095 |
| 9,522,842 | B2 | 12/2016 | Nonnet et al. | |
| 2008/0090715 | A1* | 4/2008 | Badding | C03C 3/087 |
| | | | | 501/15 |
| 2010/0129726 | A1* | 5/2010 | Tanida | H01M 8/0282 |
| | | | | 429/479 |
| 2012/0316052 | A1 | 12/2012 | Akamatsu et al. | |
| 2016/0236967 | A1* | 8/2016 | Maeda | C03C 8/24 |
| 2020/0048141 | A1* | 2/2020 | Maeda | C03C 8/24 |

FOREIGN PATENT DOCUMENTS

| | | | |
|---|---|---|---|
| CN | 103382088 A | 11/2013 | |
| JP | 2006256956 A * | 9/2006 | C03C 10/0009 |
| JP | 2008120648 | 5/2008 | |
| JP | 2008120648 A * | 5/2008 | |
| WO | 2018066635 | 4/2018 | |

OTHER PUBLICATIONS

International Search Report from PCT/EP2018/085926 dated Mar. 29, 2019.

* cited by examiner

SEALING COMPOSITIONS

FIELD

The present invention relates to glass-ceramic compositions ideally with coefficients of thermal expansion (CTE) in the range $9.0-11.5\times10^{-6}$ $K^{-1}$ (over the range of 25-1000° C.) which may be used to seal other materials having similar CTEs together. The invention also relates to glass-ceramic precursor compositions, a method of sealing materials together using the glass-ceramic precursor compositions, joints sealed with the glass-ceramic compositions, and electrochemical reactors based on ceramic membranes comprising such joints.

BACKGROUND

There are many application areas employing ceramics where sealing or joining is usefully employed in the fabrication of components or assemblies. One particular example is in the fabrication of planar solid oxide fuel cells (SOFCs) where several different materials are hermetically sealed together to form a functioning stack. There are other application areas, such as high temperature electrolysers, electrochemical oxygen generators etc. where oxygen-conducting, proton-conducting or mixed-conducting ceramic membranes are required to be sealed in an electrochemical reactor of some description. The seals are required to be hermetic, and sufficiently refractory to survive for extended periods at the elevated operating temperature of the reactor (e.g. in the range 600-1000° C.). They should also be chemically stable under the working atmosphere on both sides of the seal, and chemically compatible with the materials to which they are sealed. It is also important that they have similar CTE to the materials with which they are in contact in order to avoid unfavourable stresses which might lead to crack formation under thermal cycling.

Glass-ceramic materials have previously been used for sealing applications, with a significant proportion of this devoted to sealing materials for SOFCs, where CTE values in the range $10-14\times10^{-6}$ $K^{-1}$ are generally required.

Tulyaganov et al. [Journal of Power Sources, 242, (2013) 486-502] presents a review of sealants for SOFCs and other applications, primarily based on aluminosilicate compositions. This indicates that alkaline-earth aluminosilicate glass-ceramics, and particularly barium aluminosilicate materials (with typically 30-35 mol % BaO) are the most widely used glass-ceramics for this particular sealing application. It is recognised, however, that there are some problems associated with the high barium content, particularly reactivity towards chromium containing alloys (to form high CTE $BaCrO_4$ at the interface) and potential development of low expansion barium aluminosilicate phases in the sealing material after extended periods at service temperatures. Consequently, considerable effort has been expended on reducing the barium content or formulating barium-free glass-ceramics for SOFC sealing, for instance, by substituting SrO and/or CaO for much or all of the BaO.

Development studies have also been performed on magnesium calcium silicate based glass-ceramic sealants where diopside is one of the major crystallizing phases, see for example A. Goel et al. [J. Eur. Ceram. Soc. 27 (2007) 2325-2331], A. Goel et al. [J. Non-Cryst. Solids 3355 (2009) 193-202], and A. A. Reddy et al. [Int. J. Hydrogen Energy 37 (2012) 12,528-12,539]. These diopside based glass-ceramic sealants all contain $Al_2O_3$ and many of them contain $B_2O_3$, which is reported to improve flow behaviour, but is known to have high volatility in high temperature steam environments. CTEs in the range $8.2-11.5\times10^{-6}$ $K^{-1}$ [20-700° C.] are reported for these diopside based glass-ceramics.

U.S. Pat. No. 6,430,966 describes alkaline earth aluminosilicate glass-ceramics of formula $M_AO_x$-$M_BO_y$—$SiO_2$ for use as SOFC sealing materials. $M_A$ is Ba, Sr, Ca or combinations thereof and $M_B$ includes Al, B, P, Ga and Pb. These contain 20-50 mol % ($M_AO_x$), >5 to 15 mol % $Al_2O_3$ and 45-70 mol % $SiO_2$ as main constituents and typically cover a CTE range of $7-15\times10^{-6}$ $K^{-1}$. All exemplified glass-ceramics comprise BaO, $Al_2O_3$ and $SiO_2$, with a minor component of SrO, CaO or $K_2O$.

U.S. Pat. No. 6,532,769 describes glass-ceramic compositions of formula M1-M2-M3, in which M1 is 20-55 mol % BaO, SrO, CaO and/or MgO, M2 is 2-15 mol % $Al_2O_3$, and M3 is 40-70 mol % $SiO_2$ containing at least some $B_2O_3$. All exemplified glass-ceramics comprise BaO, $Al_2O_3$ and $SiO_2$, with a minor component of SrO or CaO.

U.S. Pat. Nos. 7,470,670 and 7,674,735 describe glass-ceramic seals which are based on alkaline-earth aluminosilicate compositions which comprise $SiO_2$, $Al_2O_3$ and CaO. In addition to these components, exemplified glass-ceramics further comprise one or more of SrO, BaO, MgO, ZnO, $Nb_2O_5$ and $Ta_2O_5$. The sealing compositions have a crystalline component in which >50 wt. % of the crystalline component has a structure selected from walstromite, cyclowollastonite, μ-(Ca,Sr)$SiO_3$, kalsilite, kaliophilite and wollastonite.

U.S. Pat. No. 7,378,361 describes glass-ceramic compositions and in an embodiment describes a composition comprising 45-55 wt % $SiO_2$, 25-40 wt % CaO, 3-6 wt % $Al_2O_3$ and 4-15 wt % MgO, where the amount of CaO+MgO is in the range 40-50 wt %.

U.S. Pat. No. 7,410,921 describes glass-ceramic compositions and in an embodiment describes a composition comprising 45-55 wt % $SiO_2$, 25-40 wt % CaO, 0-25 wt % SrO, 3-6 wt % $Al_2O_3$ and 4-15 wt % MgO, where the amount of CaO+MgO+SrO is in the range 38-50 wt %.

There is however a need to develop alternative glass-ceramic compositions, particularly ones having good high temperature stability in steam environments, stable expansion characteristics and high softening temperatures which can be used for the joining or sealing materials with coefficients of thermal expansion in the range $8-13\times10^{-6}$ $K^{-1}$.

SUMMARY OF THE INVENTION

Viewed from one aspect, the invention provides a glass precursor sealing composition comprising:
  (I) 12-40 mol % MgO;
  (II) 14-40 mol % CaO; and
  (III) 35-47 mol % $SiO_2$;
  said composition being free of $Al_2O_3$ and $B_2O_3$;
  wherein the total (MgO+CaO) content (mol %) is greater than or equal to the $SiO_2$ content (mol %).

Viewed from another aspect, the invention provides glass-ceramic composition comprising:
  (I) 12-40 mol % MgO;
  (II) 14-40 mol % CaO; and
  (III) 35-47 mol % $SiO_2$;
  wherein the composition is free of $Al_2O_3$ and $B_2O_3$;
  wherein the total (MgO+CaO) content (mol %) is greater than or equal to the $SiO_2$ content (mol %).

More preferably the invention provides a glass precursor sealing composition, e.g. in the form of a powder, comprising:

(I) 15-40 mol % MgO;
(II) 15-40 mol % CaO; and
(III) 35-45 mol % SiO$_2$;
said composition being free of Al$_2$O$_3$ and B$_2$O$_3$;
wherein the total (MgO+CaO) content (mol %) is greater than or equal to the SiO$_2$ content (mol %).

In another embodiment the invention provides a paste or a preform comprising the glass precursor sealing composition as described herein. In an embodiment the preform is a tape-cast sheet. Such a sheet can readily be applied to the joint area in its "green" state where it can be sintered and crystallised to form a glass ceramic joint as herein described.

Viewed from another aspect the invention provides a paste comprising:
A) a glass precursor sealing composition as hereinbefore defined; and
B) a liquid suspension medium; and
C) a binder, which may be dissolved in the suspension medium To make a paste, the binder may be a liquid.

Viewed from another aspect the invention provides a preform comprising:
A) a glass precursor sealing composition as hereinbefore defined; and
B) a binder;
optionally in the form of a ring.

In certain embodiments a sintered precursor glass preform may be prepared by sintering a precursor glass sealing composition but maintaining the sintered material in an amorphous condition by performing the sintering below the crystallization temperature range of the material. The sintered preform may then form a seal on heating to form a joint.

Viewed from another aspect therefore the invention provides a sintered precursor glass preform, e.g. in the form of a sheet or ring, comprising:
(I) 12-40 mol % MgO;
(II) 14-40 mol % CaO; and
(III) 35-47 mol % SiO$_2$;
said composition being free of Al$_2$O$_3$ and B$_2$O$_3$;
wherein the total (MgO+CaO) content (mol %) is greater than or equal to the SiO$_2$ content (mol %).

The glass precursor sealing composition can be prepared in a process in which a glass batch is converted to a glass precursor sealing composition, e.g. by heating a glass batch to form a homogeneous melt, cooling the same to form a precursor glass (e.g. in the form of a frit), and milling to form a glass precursor sealing composition/precursor glass powder. It will be appreciated that the cooling process is carried out in such a way to avoid devitrification.

Viewed from another aspect the invention provides a method of forming a seal between a first material and a second material, the method comprising the steps of:
applying a glass precursor sealing composition e.g. in the form of a paste or preform as described herein or sintered glass precursor preform, between the first and second materials; and
carrying out at least one heat treatment step to seal the first and second materials together via a glass-ceramic sealing composition.

It is preferred that the first and second materials each have CTE values in the range of 8-13×10$^{-6}$ K$^{-1}$ over the range of 25-1000° C.

Viewed from another aspect, the invention provides a joint comprising a first material, a second material and a glass-ceramic sealing composition sealing the first and second materials together, said glass-ceramic sealing material being obtained by heat treating the glass precursor sealing composition as hereinbefore defined.

Viewed from another aspect the invention provides an electrochemical ceramic membrane reactor comprising at least one joint according to the invention, such as a plurality of joints.

Terminology

As used herein the term "glass batch" refers to a simple blend of components (e.g. metal oxides, metal carbonates etc. . . . ) which have not undergone melt processing to form the glass precursor sealing composition.

The glass batch is heated to form a "glass melt" and is subsequently cooled (e.g. by quenching) to form a "precursor glass". The precursor glass is milled to form a "glass precursor powder", also referred to herein as a "precursor glass sealing composition".

The glass precursor sealing composition may be combined with various additives and formed into a predetermined shape, referred to as a "precursor glass preform". Alternatively, the glass precursor sealing composition/precursor glass powder may be mixed with a liquid and optionally other components to form a "precursor glass paste".

A "sintered precursor glass preform" is formed by sintering a precursor glass preform at a temperature below the crystallization temperature range.

The glass precursor sealing composition, precursor glass preform, precursor glass paste and sintered precursor glass preform are all amorphous.

A "glass-ceramic" is then formed by sintering and subsequent crystallization of the glass precursor sealing composition, e.g. a precursor glass preform or precursor glass paste (sintering and crystallization may occur in a single heating step), by a thermal treatment referred to as a sealing process. A glass-ceramic may alternatively be formed by heating and crystallising a sintered precursor glass preform.

Where CTE values are given herein, the value relates to an average CTE value over the specified temperature range.

By definition, a glass-ceramic is a material produced by the controlled crystallization of a vitreous precursor. In the present case, the vitreous precursor is in powder form, and sintering precedes crystallization. In the case where the material is applied in the form of a sintered preform, sintering is carried out in a separate thermal treatment, and the sintered preform is cooled to room temperature before use. The sintering temperature is below the crystallization temperature range, so the material, although sintered, is still completely amorphous. The crystallization then occurs during the sealing process as higher temperatures are employed.

DETAILED DESCRIPTION OF THE INVENTION

Figure 1:
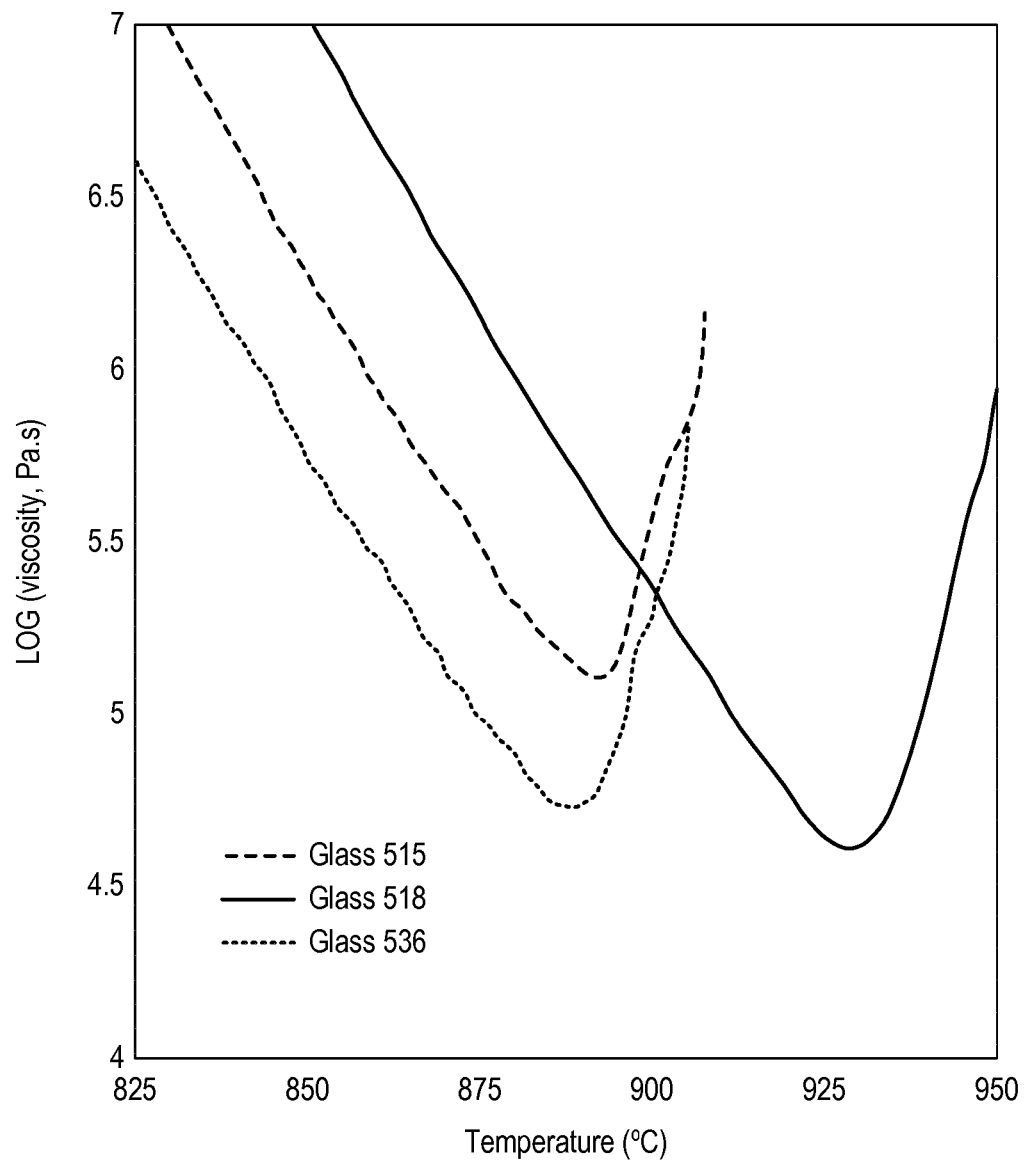
FIG. 1 is a graph showing log(viscosity) versus temperature for pre-sintered precursor glasses 515, 518 and 536 during heating at 3° C./min.

The present invention relates to a glass precursor sealing composition suitable for joining components of a ceramic membrane reactor. The invention also relates to a glass-ceramic obtained by sintering and crystallizing such a glass precursor sealing composition. Such a glass ceramic may have a CTE in the range $8\text{-}13 \times 10^{-6}$ $K^{-1}$ [25-1000° C.] The glass precursor sealing compositions of the invention can be readily prepared from simple initial blends, called a glass batch.

Glass Precursor Sealing Composition

The invention relates to a glass precursor sealing composition comprising:
 (I) 12-40 mol % MgO;
 (II) 14-40 mol % CaO; and
 (III) 35-47 mol % $SiO_2$;
 said composition being free of $Al_2O_3$ and $B_2O_3$;
 wherein the total (MgO+CaO) content (mol %) is greater than or equal to the $SiO_2$ content (mol %). Where mol % is referred to herein in the context of the sealing composition, this means mol % in the sealing composition as a whole.

The total (MgO+CaO) content (mol %) is greater than or equal to the $SiO_2$ content (mol %). It is generally preferred that the total (MgO+CaO) content (mol %) is greater than the $SiO_2$ content (mol %). Glass-ceramics having the total (MgO+CaO) content (mol %) greater than the $SiO_2$ content (mol %) are expected to exhibit improved chemical stability against high temperature steam environments and are favoured due to their low reactivity towards more basic ceramic membrane materials such as those containing lanthanum. Preferably the total (MgO+CaO) content is 40 to 62 mol %, such as 42-62 mol %, especially 45-60 mol %, such as 47-55 mol %.

In certain embodiments it is preferred that MgO is present in an amount of at least 15 mol %, such as at least 20 mol % of the sealing composition (e.g. 20 to 40 mol %), preferably 21 to 40 mol %, especially 21 to 35 mol %.

In certain embodiments it is preferred that CaO is present in an amount of 15 to 40 mol % of the sealing composition, preferably 20 to 35 mol %.

In certain embodiments it is preferred that $SiO_2$ is present in an amount of at least 38 mol %, such as 38 to 46 mol % of the sealing composition, preferably 40 to 47 mol % or 40 to 46 mol %, especially 41 to 46 mol %. It is particularly preferred that $SiO_2$ is present in an amount of at most 45 mol %. Particularly preferred amounts are 38 to 45 mol %, especially 40 to 45 mol %. Glass-ceramics having lower $SiO_2$ contents are expected to exhibit improved chemical stability against high temperature steam environments and are favoured due to their low reactivity towards more basic ceramic membrane materials such as those containing lanthanum.

The sealing composition is free of $Al_2O_3$. The inclusion of $Al_2O_3$ may cause the development of alumino-silicate phases in the crystallized sealing materials, which undesirably reduce the CTE of the sealing material. In addition, it has been observed that magnesium alumino-silicate phases can exhibit slow transformation kinetics and may gradually convert to more thermodynamically stable phases during extended holds at service temperatures, causing undesirable changes in CTE.

The sealing composition is also free of $B_2O_3$. The inclusion of $B_2O_3$ may may lead to enhanced retention of amorphous phase(s) and concomitant decrease in refractoriness of the sealing material. Additionally, it increases the risk of loss of volatile boron-containing species which may have an adverse effect on the electrochemical performance of the membrane system.

As used herein, "free of $Al_2O_3$ and $B_2O_3$" means that the sealing composition comprises at most 0.05 mol % $Al_2O_3$ and at most 0.05 mol % $B_2O_3$. Ideally there is so little $Al_2O_3$ and $B_2O_3$ that these compounds are present in trace amounts/impurity levels or not detectable at all.

The low $SiO_2$ content in combination with the exclusion of $Al_2O_3$ and $B_2O_3$ ensures that there will be very little residual glass in the material after crystallization, which ensures a high softening temperature.

In a preferred embodiment the combined (MgO+CaO) content is at least 1 mol % greater than the $SiO_2$ content, such as at least 2 mol % greater, especially 3.0 mol % or more. In some embodiments the excess may be 5.0 mol % or more.

Sealing compositions of the invention may further comprise one or more additional oxides selected from transition metal oxides, lanthanide group oxides (e.g. $La_2O_3$), further alkaline earth oxides (i.e. in addition to MgO and CaO), $GeO_2$ and $P_2O_5$. Preferred additional oxides include $ZrO_2$, $TiO_2$, $P_2O_5$, BaO, SrO, $La_2O_3$, $Y_2O_3$, $Nb_2O_5$ and $GeO_2$.

In an embodiment sealing compositions of the invention may further comprise one or more additional oxides selected from transition metal oxides, further alkaline earth oxides (i.e. in addition to MgO and CaO), $GeO_2$ and $P_2O_5$.

In an embodiment sealing compositions of the invention may further comprise one or more additional oxides selected from $ZrO_2$, $TiO_2$, $P_2O_5$, BaO, SrO, $Y_2O_3$, $Nb_2O_5$ and $GeO_2$.

The total content of oxides other than MgO, CaO and $SiO_2$ is preferably 0-15 mol %, preferably 0-10 mol %, especially 0.05-15%, 0.5-15% 1.0-15% or 1.0-10 mol %. If present, the minimum value of any other oxide may be 0.05 mol %, i.e. the total content of oxides other than MgO, CaO and $SiO_2$ may be 0.05-15 mol %, preferably 0.05-10 mol %. It is sometimes advantageous to add small amounts of transition metal oxides to impart some colour. When transition metal compounds are added for colouration then a minimum of 0.01 mol % transition metal compound may be acceptable.

Viewed from another aspect therefore the invention provides a glass precursor sealing composition comprising:
 (I) 12 to 40 mol % MgO;
 (II) 14 to 40 mol % CaO;
 (III) 35 to 47 mol % $SiO_2$;
 (IV) 0.05 to 15 mol % of at least one oxide selected from transition metal oxide, lanthanide group oxide, further alkaline earth oxide, $GeO_2$ and $P_2O_5$;
 said composition being free of $Al_2O_3$ and $B_2O_3$;
 wherein the total (MgO+CaO) (mol %) is greater than or equal to the $SiO_2$ content (mol %).

It is preferred that the sealing composition of the invention comprises at least one oxide selected from: a transition metal oxide(s), a lanthanide group oxide(s) (e.g. $La_2O_3$), a further alkaline earth oxide(s), $GeO_2$ and $P_2O_5$. It is particularly preferred that the sealing composition of the invention comprises at least one oxide selected from: a transition metal oxide(s), a further alkaline earth oxide(s), $GeO_2$ and $P_2O_5$. Preferably, the amount of such an oxide or oxides is in the range of 0.05 to 15 mol %, such as 0.05 to 10 mol % or 0.5 to 15 mol %. Mixtures of oxides can be used such as two oxides.

In a preferred embodiment the glass precursor sealing composition comprises, or consists of: MgO, CaO, $SiO_2$ and one or more oxides selected from: $ZrO_2$, $TiO_2$, $P_2O_5$, BaO, $La_2O_3$, $Y_2O_3$ and $Nb_2O_5$.

In a preferred embodiment the glass precursor sealing composition comprises, or consists of: MgO, CaO, $SiO_2$ and one or more oxides selected from: $ZrO_2$, $TiO_2$, $P_2O_5$, BaO, $Y_2O_3$ and $Nb_2O_5$.

In an embodiment the glass precursor sealing composition has a content of $La_2O_3$ of 0 to 0.5 mol %, preferably 0 to 0.1 mol %, such as 0 to 0.05 mol %. In some embodiments the composition may be free of $La_2O_3$, meaning that the sealing composition comprises at most 0.05 mol % $La_2O_3$. Ideally there is so little $La_2O_3$ and that that this compound is present in trace amounts/impurity levels or not detectable at all.

In an embodiment the glass precursor sealing composition comprises 0 mol % to less than 5 mol % $ZrO_2$, such as 0-3.0 mol %, 0-2.0 mol %, or 0-1.0 mol %. In an embodiment the glass precursor sealing composition does not comprise any $ZrO_2$.

In one embodiment of the invention the glass precursor sealing composition consists of $SiO_2$, metal oxides and non-metal oxides. In one embodiment of the invention the sealing composition consists of $SiO_2$ and metal oxides only.

Glass Batch

Glass precursor sealing compositions according to the present invention are preferably prepared by firstly melt mixing a glass batch. The glass batch can be a simple blend of MgO, CaO, $SiO_2$ (and any other oxides that are desired) in the proportions set out in the preceding section "Sealing compositions".

In some embodiments alternative metal compounds which convert to the metal oxide during melt processing may be used in the glass batch in place of the metal oxide, e.g. metal carbonates, nitrates or phosphates. Where these alternative metal compounds(s) are used, appropriate amounts of compounds in the glass batch can be established by working backwards from the desired amounts of metal oxides in the glass precursor sealing composition. In essence, the same molar amounts are required. By way of example, a glass precursor sealing composition comprising 25 mol % MgO, 25 mol % CaO and 50 mol % $SiO_2$ can be prepared from a glass batch comprising 25 mol % MgO, 25 mol % $CaCO_3$ and 50 mol % $SiO_2$ (per 100 g of glass: 18.6 g MgO, 46.6 g $CaCO_3$ and 55.5 g $SiO_2$).

The use of compounds as a precursor to the metal oxide can be advantageous since some metal oxides react with moisture or $CO_2$ in the air over time and thereby change composition which may lead to inaccuracies in weighing appropriate amounts of the metal oxide. Precursor compounds which are more stable to storage than the corresponding metal oxide are particularly preferred. Suitable precursor compounds include metal nitrates, carbonates or phosphates.

In addition to MgO and CaO (or precursor compounds thereof), the glass batch may contain the additional metal oxides discussed above or precursors thereto, e.g. corresponding metal nitrates, carbonates or phosphates.

It will be appreciated that more complex compounds may also act as a source of the desired metal ions, e.g. magnesium silicate compounds. The skilled person is familiar with the formulation of the glass batch and the variety of compounds that can be used to prepare the glass batch.

Formation of Glass Precursor Sealing Compositions

The glass batch of metal/non-metal oxides or more generally metal/non-metal compounds may be blended as a powder and needs to undergo a melt processing step prior to forming the glass precursor sealing composition. In a melt processing step the glass batch (e.g. oxides and/or non-oxide compounds or perhaps a blend of compounds) is melted to form a homogenous glass melt e.g. at a temperature above 1200° C., such as 1400-1650° C., preferably 1200 to 1800° C., especially at 1450-1600° C.

Preferably the glass batch is heated in a suitable container such as a platinum crucible to a temperature which is sufficient to produce a homogeneous melt (typically 1400-1650° C.).

The glass melt is then cooled to room temperature. Ideally, the glass melt is cooled rapidly, ideally by quenching into water to produce a glass frit. Rapid cooling is preferred as this helps to suppress devitrification. The use of water quenching is especially preferred as the resulting glass frit is readily milled to form a powder. The cooled glass melt, ideally the glass frit, should therefore be amenable to milling to produce the precursor glass powder.

The amorphous solid that forms after cooling is preferably then comminuted, e.g. milled, to produce the glass precursor sealing composition in the form of a powder. The powder preferably has a mean particle size of 1-200 μm (e.g. measured by laser diffraction), such as 5 to 150 μm, preferably 5 to 100 μm. Where pre-sintered precursor glass preforms are to be produced, a powder size of 10-100 μm is preferred. Where the glass precursor sealing composition is to be applied in the form of a paste, a powder size of 5-10 μm is preferred.

The particle size is important for crystallization kinetics because the crystals are nucleated at the particle surfaces—the finer the particles, the more surface area and more rapid crystallization (and hence less flow). Larger particle size is therefore important for achieving the required flow at slow heating rates as it limits the rate of crystal nucleation and extends the sealing range because more time is required for the crystals to grow to a size which is sufficient to reach the core of the particle.

The glass precursor sealing composition is therefore a "melt processed" composition.

The glass precursor sealing composition may be applied to the joint surfaces by any one of a variety of techniques, such as (but not exclusively) screen printing, painting, ink-jet printing, spraying, dip-coating, etc. It could also be produced in the form of a 'green' preform, such as an un-fired, tape-cast sheet. It will be known to those skilled in the art, that these application methods will generally require that the glass precursor sealing composition be mixed with processing aids such as solvents, binders, plasticizers, dispersants etc. in order to impart suitable processing characteristics (viscosity, wetting, drying etc.) for the chosen application technique.

In an embodiment the precursor glass sealing composition may be incorporated into a paste or made into a preform for ease of application when making a joint. Pastes and preforms will be known to those skilled in the art. Typically, pastes and preforms will comprise the precursor glass sealing composition and a binding agent, often an organic binder, such as a polymeric binder, such as PVA, PVB, PEG and optionally a liquid, such as water, ethanol etc.

The binder can be combined with the precursor glass sealing composition and pressed into a preform. Conveniently, such a preform can be in the shape of a ring. The binder imparts strength to the powder body, keeping the precursor glass sealing composition in a form that can be readily applied to a surface.

A preform will typically comprise:

(A) a precursor glass sealing composition of the invention; and (B) a binder component (such as a polymer).

In an embodiment the precursor glass preform may be in the form of a sheet, such as a tape-cast sheet when used to join two materials together.

In a further embodiment, the sealing composition may be in the form of a paste and this forms a further aspect of the invention. A paste will typically comprise:

(A) a precursor glass sealing composition of the invention; and (B) a liquid suspension medium; and (C) a binder, which may be dissolved in the suspension medium).

The relative amounts of binder/solvent can be tailored to form a suitable viscosity for application.

It will be appreciated that during the sealing process, any organic processing aids which might have been included to facilitate the application of the precursor glass sealing powder to the joint surfaces will burn off if the sealing process is carried out in an atmosphere which contains oxygen, e.g. air.

Alternatively, the precursor glass preform may be sintered to form a sintered precursor glass preform. In some embodiments it may be necessary to carry out the sealing process in an inert atmosphere. In such a situation, it is preferred to use a sintered preform from which the organic binder has already been burnt off during the sintering process.

A sintered preform can be prepared by heating the preform in an oxygen containing atmosphere to a temperature above the glass transition temperature but below the crystallisation temperature range. Typically, the temperature should be 50 to 150° C. above the Tg of the material of the precursor glass sealing composition, e.g. 800 to 925° C.

In a typical procedure the precursor glass sealing powder is shaped to form a 'green' preform of the desired geometry. Organic processing aids such as binders and plasticizers will typically be added to the precursor glass sealing powder prior to shaping to facilitate the shaping operation and impart sufficient green-strength to the shaped part to allow handling. The shaping process may involve pressing in a suitable metal die. The organic processing aid, if added, will burn-off during heating of the shaped preform to the sintering temperature. The precursor glass sealing powder densifies at the sintering temperature to form a solid amorphous preform. The sintered preform may take any suitable form, such as a ring.

The minimum viscosity ($\eta_{min}$) of the glass precursor sealing compositions of the invention when measured on the sintered precursor glass according to ASTM C1351M-96 (2012) (Standard Test Method for Measurement of Viscosity of Glass by Viscous Compression of a Solid Right Cylinder) is ideally between $10^4$ Pa·s and $10^8$ Pa·s, preferably $10^4$ to $10^7$ Pa·s, more preferably $10^4$ to $10^6$ Pa·s.

The precursor glass sealing compositions preferably have softening temperatures above 1000° C. following the sealing heat treatment, preferably above 1100° C. During heating to the sealing temperature, the glass phase flows prior to reaching a temperature of 1000° C. The initial reduction in viscosity seen in the measurements (e.g. as shown in FIG. 1) is due to the increased fluidity of the glass phase as the temperature increases—as heating progresses, the glass phase starts to crystallize, and the volume fraction of crystals gradually increases until flow becomes impossible. By the time the joint has reached 1000° C. the sealing material will be solid with very little or no residual glassy phase.

The crystallisation temperature range may vary depending on the precursor glass composition, heating rate and powder particle size, but will typically be in the range 850 to 950° C.

Glass precursor sealing compositions having a viscosity profile as described herein are highly suitable for sealing applications, since sealing procedures will involve heating to a temperature of 950 to 1100° C. and so under these conditions the glass precursor sealing composition has good ability to sinter, flow and crystallise and thereby form an effective seal with other materials in the joint (described below).

In an embodiment the Tg of the glass precursor sealing composition may be 700 to 800° C.

Preparation of Glass-Ceramics

Initially the precursor glass powder (which may be in the form of a 'green' precursor glass preform or a precursor glass paste) is firstly sintered. The precursor glass powder densifies by a process of viscous sintering as the temperature is increased. Sintering typically takes place during the sealing process although a sintered precursor glass preform can also be used in the sealing process. The materials should remain amorphous during sintering—the phase change occurs during crystallization which follows sintering. Sintering typically involves heating to a temperature of 100° C. or more above the $T_g$ of the precursor glass powder, e.g. to a temperature of at least 800° C., or at least 850° C.

The sealing process as a whole (which includes sintering, then flow, then crystallisation) typically involves heating the precursor glass sealing composition at a rate of 1 to 20° C. per minute, such as 1 to 10° C. per minute. Firstly, the sintering temperature range is reached. As the temperature is further increased the material flows and as the temperature increases still further it crystallises. Crystallisation typically nucleates at the former surfaces of the precursor glass powder particles. The temperature is typically held at a temperature above the crystallisation range for a period of time to ensure completion of the crystallization process. A typical period is 1 to 5 hrs.

Electrochemical devices can comprise brittle components and hence heating and cooling rates during the sealing process need to be slow to avoid fracture due to thermal stresses. There is an incubation period for crystal nuclei to form in the sealing compositions of the invention and the lag in crystal growth at high heating rates is advantageous in that it allows better flow. However, as high heating rates, are challenging due to the above mentioned limitations, we have discovered that flow characteristics can be optimised at low heating rates, such as 1 to 20° C. per minute, such as 1 to 10° C. per minute.

A glass-ceramic is developed on crystallisation. The glass-ceramic comprises one or several crystalline phases and potentially a residual glassy phase. The low $SiO_2$:(MgO+CaO) ratio and the absence of $Al_2O_3$ and $B_2O_3$ favour the development of glass-ceramics with low residual glass contents. In a preferred embodiment, the residual glass content of the glass-ceramic is below 10 vol %.

In terms of chemical make-up, the percentages above for the glass precursor sealing composition also apply to the glass-ceramic. There is a redistribution or re-arrangement of the constituent elements during the crystallization process, but the overall composition of the material remains unchanged. All the preferred embodiments, such as component percentages, of the precursor therefore apply to the glass-ceramic. Glass-ceramic compositions of the invention preferably have coefficients of thermal expansion (CTE) in the range 8.0 to 13.0×10⁻⁶ K⁻¹, preferably 9.0-11.5×10⁻⁶ K⁻¹ over the range of 25-1000° C.

Joint Formation

As used herein a "joint" is a structure in which at least a first material and a second material (which may be the same or different) are sealed together by heating in physical contact with the precursor glass sealing composition (which may be in the form of a 'green' preform, sintered preform or a paste). In some embodiments the sealing material may seal together 3 or more materials. It is preferred that the first and second materials of the joint each have CTEs in the range of 8-13×10⁻⁶ K⁻¹ (over the range of 25-1000° C.). Preferably the joint comprises a first material and a second material (which may be the same or different) sealed together by the sealing composition of the invention, in which the first and second materials each have CTEs in the range of 8-13×10⁻⁶ K⁻¹ (over the range of 25-1000° C.). In general it is preferred that there is no more than 1×10⁻⁶ K⁻¹ difference between the CTE of the glass-ceramic and the CTE of each of the first and second materials.

The method of forming a joint comprises the steps of applying a precursor glass sealing composition according to the invention such as in the form of a paste, sintered preform or a green preform between a first material and a second material in the location where the seal is desired, such that good physical contact is obtained, followed by thermal treatment to seal the first and second materials together. Suitable temperatures and heating durations for the heat treatment will readily be established by those skilled in the art. However, by way of illustration, heat treatment typically involves heating the area where the seal is to be formed to a temperature of at least 925° C. As the temperature increases the sealing material sinters then flows. As the temperature rises further, the material begins to crystallise. The temperature is then held at a holding temperature for a period of time (typically at least 1 h) to allow completion of the crystallization process, followed by gradual cooling to room temperature. The maximum holding temperature is typically 1150° C. The sealing composition crystallises to form a glass-ceramic bond with the desired thermal expansion characteristics.

In a preferred embodiment the holding temperature is 925° C. or above, such as 950-1150° C.

The sealing composition may be applied in the form of a sintered preform. Heating will then cause the preform to flow and crystallise to form the desired joint. In a preferred embodiment the holding temperature is 925° C. or above, such as 925-1150° C., such as 950-1150° C.

A load may be applied during the thermal treatment step to promote flow and bond formation.

The materials to be sealed are typically other ceramics although the sealing of metal materials or ceramic/metal composites is also envisaged.

In one embodiment the joint is a seal between components of an electrochemical reactor incorporating ceramic membranes.

Once the seal is formed the material can be cooled. Cooling is preferably controlled in order to avoid large thermal gradients which might otherwise cause fracture of the sealed joint. Typical cooling rates may be in the range of 0.5 to 10° C. per minute, such as 1 to 5° C. per minute.

Viewed from another aspect the invention provides a method of forming a seal between a first material and a second material, the method comprising the steps of:

applying a glass precursor sealing composition as hereinbefore defined between first and second materials where the seal is desired;

heating at a heating rate of 1 to 20° C. per minute to a temperature in the range of 925 to 1150° C. to seal the first and second materials together. Preferably, the formed joint is then control cooled, e.g. at 1 to 5° C. per minute back to ambient temperature.

Viewed from another aspect the invention provides a method of forming a seal between a first material and a second material, the method comprising the steps of:

applying a glass precursor sealing composition as hereinbefore defined between first and second materials where the seal is desired;

heating at a heating rate of 1 to 20° C. per minute so that the glass precursor sealing composition first sinters, then flows and then crystallises to seal the first and second materials together. Preferably, the formed joint is then cooled in a controlled manner, e.g. at 1 to 5° C. per minute back to ambient temperature.

The invention will now be described with reference to the following non limiting examples.

Test Methods

Glass CTE and Tg

CTE and Tg of the precursor glasses were measured in a horizontal axis dilatometer fitted with alumina pushrod and holder. Sample dimensions were approximately 45 mm long×5 mm×5 mm in cross-section, and a heating rate of 6° C. per minute was employed. A 50 mm sapphire reference, measured under the same conditions, was used to correct for pushrod and holder effects.

Glass-Ceramic CTE

CTE of the crystallised materials (glass-ceramics) was measured in a horizontal axis dilatometer fitted with alumina pushrod and holder. Sample dimensions were approximately 45 mm long×5 mm×5 mm in cross-section, and a heating rate of 3° C. per minute was employed. A 50 mm sapphire reference, measured under the same conditions, was used to correct for pushrod and holder effects.

EXAMPLES

By way of example, a number of glasses were prepared to demonstrate how the materials of the present invention may be employed in the sealing of other materials. The compositions of these precursor glasses are presented in Table 1.

TABLE 1

| | (mol %) | | | | | | | | |
|---|---|---|---|---|---|---|---|---|---|
| Glass No. | MgO | CaO | $SiO_2$ | BaO | $La_2O_3$ | $ZrO_2$ | $P_2O_5$ | $Nb_2O_5$ | $TiO_2$ |
| 448 | 25 | 27 | 42.5 | | | 5.5 | | | |
| 515 | 27 | 25 | 42.5 | | | 5.5 | | | |
| 516 | 25 | 25 | 45 | | | 5 | | | |
| 518 | 23 | 25 | 45 | | 2 | 5 | | | |
| 519 | 23 | 27.5 | 42 | 2 | | 5.5 | | | |

TABLE 1-continued

| Glass No. | MgO | CaO | SiO$_2$ | BaO | La$_2$O$_3$ | ZrO$_2$ | P$_2$O$_5$ | Nb$_2$O$_5$ | TiO$_2$ |
|---|---|---|---|---|---|---|---|---|---|
| 520 | 23 | 29 | 42 | 2 | 4 | | | | |
| 521 | 24 | 30 | 44 | 2 | | | | | |
| 533 | 23 | 29 | 44 | 2 | | | | 2 | |
| 536 | 22 | 30 | 44 | 2 | | | 2 | | |
| 537 | 22 | 24 | 42 | 10 | | | 2 | | |
| 548 | 23.6 | 26.7 | 44.9 | | | 2.7 | 2.1 | | |
| 551 | 30.8 | 20.6 | 43.8 | | | 2.7 | 2.1 | | |
| 552 | 30 | 22 | 44 | 2 | | | 2 | | |
| 553 | 34 | 17 | 43 | 2 | 4 | | | | |
| 554 | 17 | 34 | 43 | 2 | 4 | | | | |
| 555 | 22 | 30 | 41 | | | | 2 | | 5 |
| 556 | 24 | 30 | 38 | | | | | | 8 |
| 575 | 27.8 | 27.8 | 44.4 | | | | | | |

The glasses were prepared by mixing high-purity raw materials (e.g. magnesium carbonate, calcium carbonate, quartz, barium carbonate, zirconium silicate) in the appropriate proportions, and heating at temperatures in the range 1480-1560° C. in a ZGS platinum crucible until homogenous melts were formed. The melts were quenched by casting onto water to form a friable, amorphous frit. After drying, the frit was milled in an aluminous porcelain mill jar with alumina milling media to yield a glass powder with a mean particle size in the range 5-100 nm. Small glass bars were also cast from each melt to provide a sample for determination of glass CTE and glass transition temperature. The bars were cast onto a pre-heated metal plate and transferred to a hot chamber furnace soon afterwards for annealing at a temperature of 750° C. The samples were cooled to room temperature at a rate of 3° C./min or less after holding at the annealing temperature for 30 minutes.

The precursor glasses were characterised by measuring CTE (25-700° C.) and glass transition temperature (Tg) in a horizontal axis dilatometer fitted with alumina pushrod and holder. Sample dimensions were approximately 45 mm long×5 mm×5 mm in cross-section, and a heating rate of 6° C. per minute was employed. A 50 mm sapphire reference, measured under the same conditions, was used to correct for pushrod and holder effects.

The suitability of these glasses as sealing materials was assessed by measuring viscosity during heating at 3° C./min in a parallel plate viscometer (ASTM C1351M-96(2012)) using a fused quartz loading rod and holder. Samples for viscosity determination were prepared by pressing discs of the precursor glass powders to which PVA binder had been added, and sintering at a temperature of 90-110° C. above the measured glass transition temperature for 15 minutes. Porosity levels after sintering were estimated to be <5% based on SEM observations on fracture surfaces. Dimensions of the sintered discs were approximately 7 mmØ×1-2 mm thick. Disc samples were placed between two flat alumina discs (17 mmØ×0.64 mm thick) for the viscosity measurement, with the pushrod load of approximately 500 g applied to the top alumina disc. Deformation of the samples was measured by an LVDT. Viscosity versus temperature curves for three of the precursor glasses are shown in FIG. 1 by way of example. Of particular interest is the minimum viscosity reached during heating to the typical sealing temperature of 1000° C. as this is a good indicator of the material's ability to flow and form a good seal with the other joint materials. It has been found that seal formation is possible where transient viscosities as low as $10^6$-$10^7$ Pa·s are reached during heating, though it is preferable to reach viscosities in the range $10^4$-$10^6$ Pa·s to ensure good seal quality.

Bar samples for CTE measurement were prepared from the precursor glass powders (with added PVA binder) by free-form moulding. The green bars were subjected to heat-treatments in the range 900° C.-1100° C. for 1 hour to simulate sealing/heat-treatment cycles. Thermal expansion characteristics of the resulting glass-ceramics were measured on samples 40-50 mm in length by approximately 5 mm×5 mm in cross-section during heating at 3° C./min to 1000° C., and during cooling at 3° C./min or less to below 50° C. in a horizontal axis dilatometer equipped with alumina pushrod and holder. A 50 mm sapphire reference, measured under the same conditions, was used to correct for pushrod and holder effects. Table 2 presents the expansion, Tg and viscosity results on the precursor glasses and crystallized glass-ceramics.

TABLE 2

CTE, Tg and minimum viscosity values for precursor glasses and CTE values for the heat-treated materials.

| Glass No | Glass CTE $10^{-6}$ K$^{-1}$ (25-700° C.) | Glass T$_g$ (° C.) | Viscosity minimum during heating, ($\eta_{min}$) LOG(Pa·s) | CTE after crystallization $10^{-6}$ K$^{-1}$ (25-1000° C.) | Crystallization heat-treatment |
|---|---|---|---|---|---|
| 448 | 9.2 ± 0.1 | 760 ± 5 | 5.5 ± 0.2 | 10.4 ± 0.1 | 1000° C./1 h |
| 515 | 9.2 ± 0.1 | 760 ± 5 | 5.1 ± 0.2 | 10.4 ± 0.1 | 1000° C./1 h |
| 516 | 9.0 ± 0.1 | 760 ± 5 | 5.2 ± 0.2 | 9.8 ± 0.1 | 1000° C./1 h |
| 518 | 9.1 ± 0.1 | 765 ± 5 | 4.6 ± 0.2 | 10.1 ± 0.1 | 1000° C./1 h |
| 519 | 9.5 ± 0.1 | 765 ± 5 | 5.0 ± 0.2 | 11.0 ± 0.1 | 1000° C./1 h |
| 520 | 9.6 ± 0.1 | 760 ± 5 | 5.0 ± 0.2 | 10.7 ± 0.1 | 1000° C./1 h |
| 521 | 10.2 ± 0.1 | 740 ± 5 | 5.4 ± 0.2 | 11.3 ± 0.1 | 1000° C./1 h |
| 533 | 9.8 ± 0.1 | 745 ± 5 | 4.9 ± 0.2 | 10.7 ± 0.1 | 1000° C./1 h |
| 536 | 10.2 ± 0.1 | 730 ± 5 | 4.7 ± 0.2 | 10.9 ± 0.1 | 1000° C./1 h |
| 537 | 10.4 ± 0.1 | 725 ± 5 | 4.8 ± 0.2 | 11.3 ± 0.1 | 1000° C./1 h |
| 548 | 9.3 ± 0.1 | 735 ± 5 | 4.8 ± 0.2 | 10.5 ± 0.1 | 1000° C./1 h |
| 551 | 9.0 ± 0.1 | 740 ± 5 | 5.3 ± 0.2 | 10.7 ± 0.1 | 1000° C./1 h |
| 552 | 9.6 ± 0.1 | 735 ± 5 | 5.1 ± 0.2 | 10.5 ± 0.1 | 1000° C./1 h |
| 553 | 8.9 ± 0.1 | 755 ± 5 | 5.5 ± 0.2 | 10.9 ± 0.1 | 1000° C./1 h |
| 554 | 9.3 ± 0.1 | 755 ± 5 | 5.4 ± 0.2 | 10.3 ± 0.1 | 1000° C./1 h |
| 555 | 10.1 ± 0.1 | 735 ± 5 | 5.1 ± 0.2 | 11.0 ± 0.1 | 1000° C./1 h |
| 556 | 10.1 ± 0.1 | 740 ± 5 | 6.2 ± 0.2 | 10.9 ± 0.1 | 1000° C./1 h |
| 575 | 9.8 ± 0.1 | 735 ± 5 | 5.8 ± 0.2 | 10.9 ± 0.1 | 1000° C./1 h |

Two examples of how the glass-ceramics of the present invention can be used to produce seals are given below.

Example 1 Sealing of LCM

Figure 2:
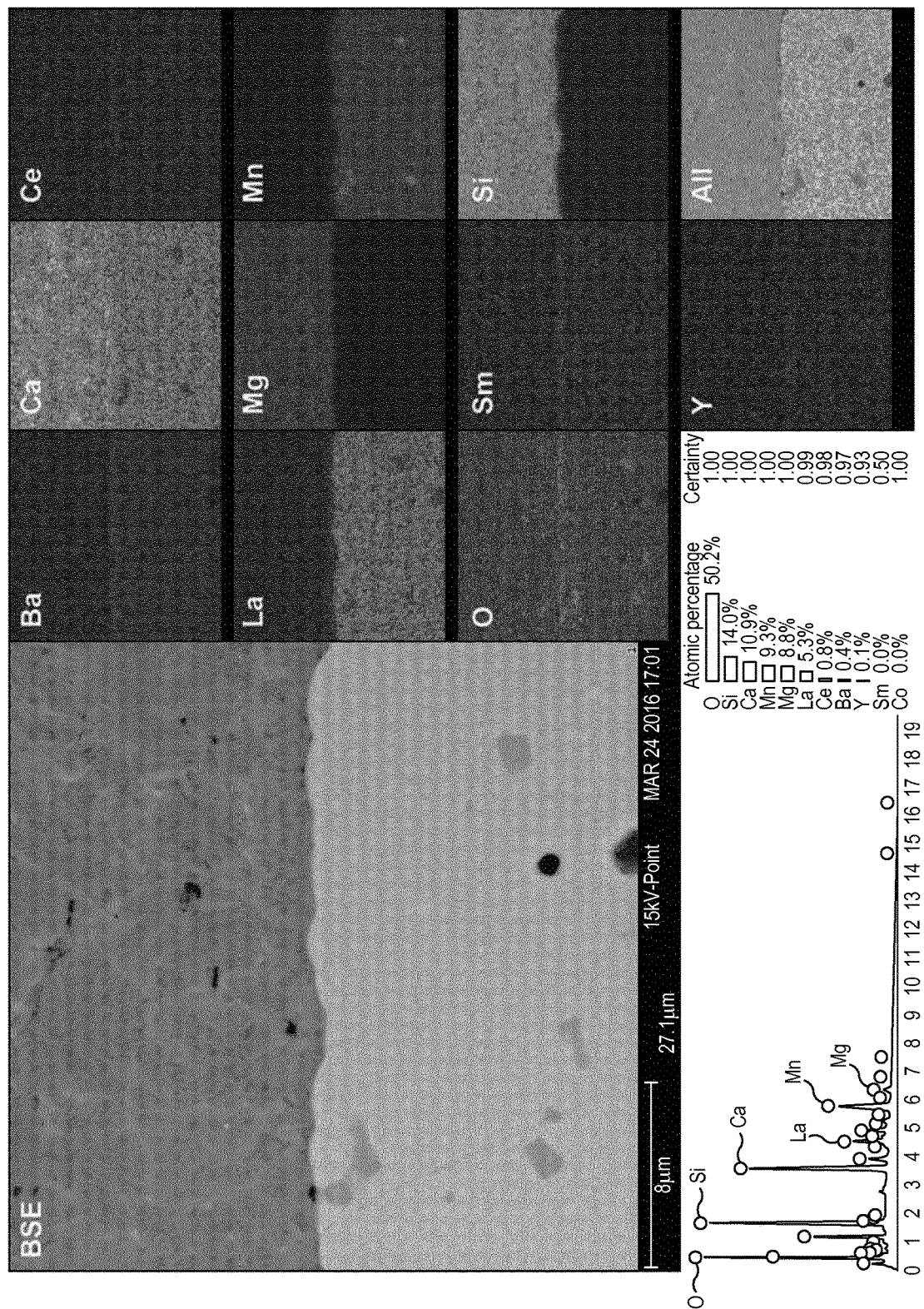
FIG. 2 is a back-scattered electron image of the interface between the glass-ceramic sealant (upper part) and the LCM bar (lower part), together with elemental mapping of the joint area. The SEM image demonstrates the integrity of the seal.

A glass frit of composition 24 mol % MgO, 30 mol % CaO, 44 mol % $SiO_2$, 2 mol % BaO (Glass 521, Table 1) was produced by quenching a melt into cold water. The frit was dried and milled in an aluminous porcelain mill-jar to produce a powder with an average particle size in the range 10-20 nm. A slurry was made up by mixing the glass powder into an ethanol based solution of PVB/PEG400, and this was tape cast to produce a green tape of approximately 200 µm thickness. After drying, a piece of the green tape was cut and placed between the side faces of two rectangular ceramic bars (5 mm×5 mm×50 mm) of lanthanum calcium manganite (LCM), one of which had previously been used for CTE determination (measured CTE $12.4 \times 10^{-6}$ $K^{-1}$, [25-1000° C.]). A small load of approximately 100 g was placed on top of the uppermost bar, and the assembly was transferred to a chamber furnace. The assembly was heated to a holding temperature of 950° C. at a rate of 3° C./min, and held at this temperature for 1 hour before cooling at 3° C./min or less to room temperature. The two LCM bars were strongly bonded after the thermal treatment. The joint was sectioned and polished, and examined using an SEM. FIG. 2 shows a back-scattered electron image of the interface between the glass-ceramic sealant and the LCM bar, together with elemental mapping of the joint area. The SEM image demonstrates the integrity of seal.

Example 2 Sealing of a Ferritic Steel Header to a Y-PSZ Ferrule

Figure 3:
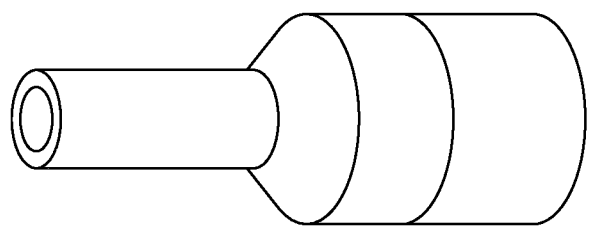
FIG. 3 illustrates a hermetic seal between a ferritic heat-resisting steel header and a partially stabilized zirconia ferrule fabricated using a sintered preform in the form of a ring produced from precursor glass 536 powder, as part of a graded expansion connector in an electrochemical reactor.
Figure 3:
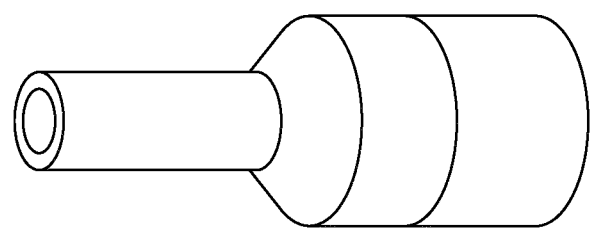
Figure 3:
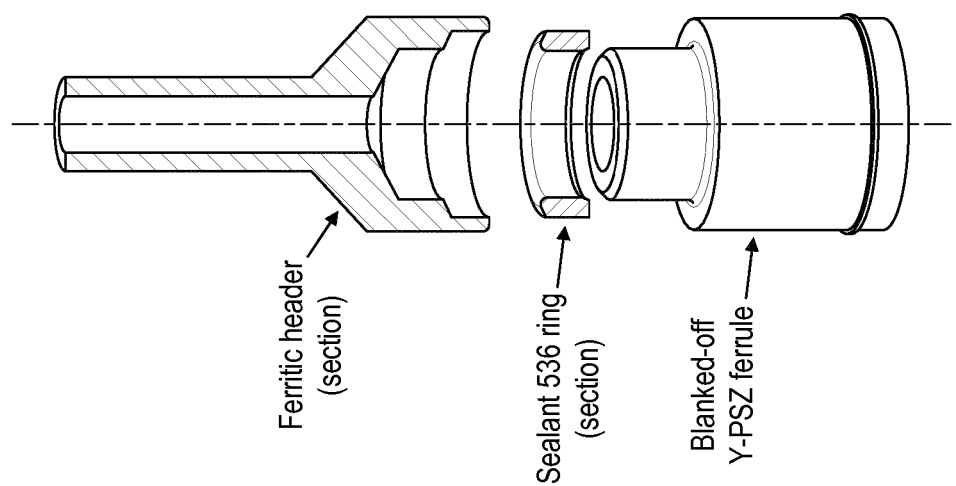
Figure 4:
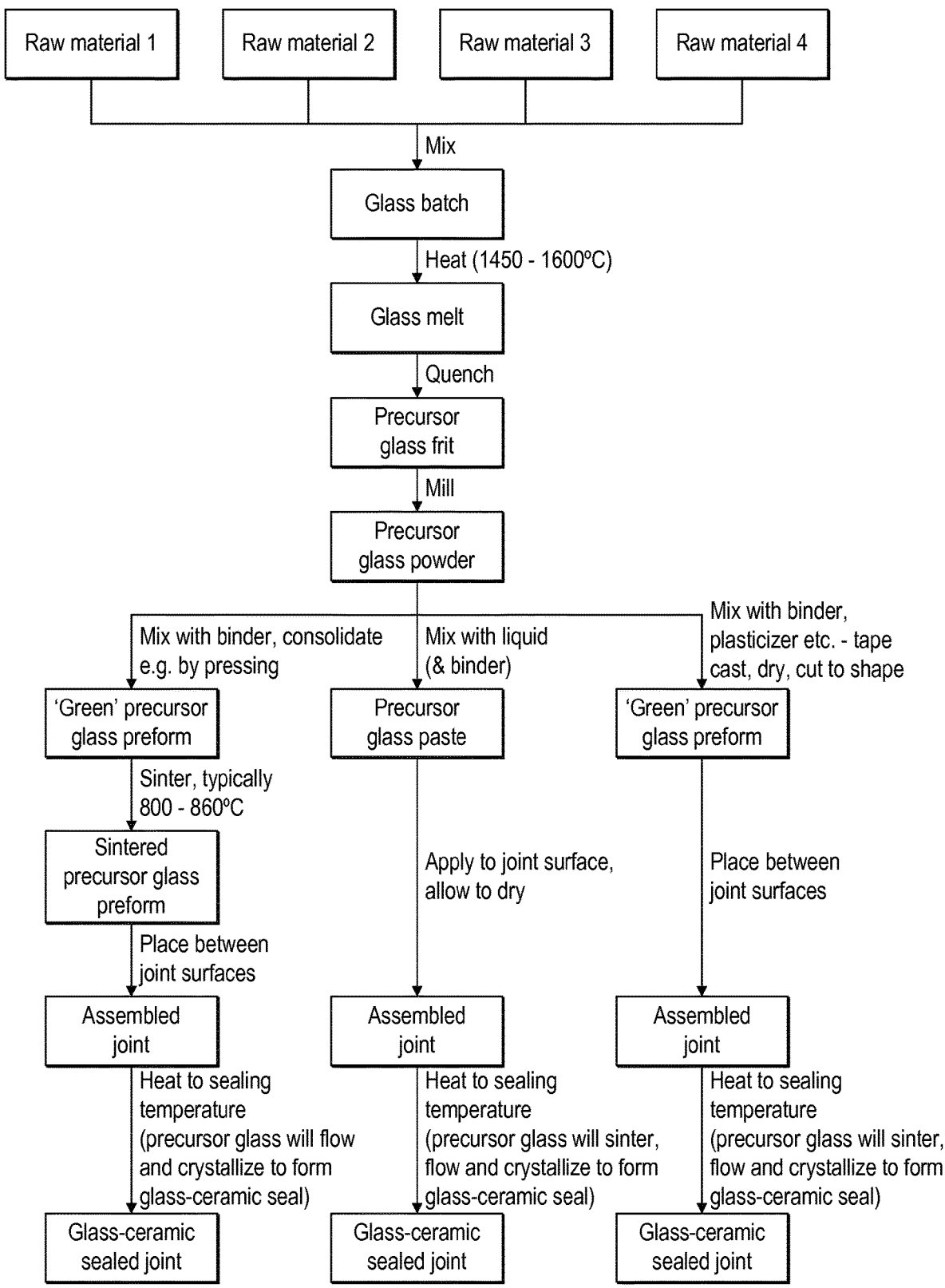
FIG. 4 illustrates a typical sequence of steps for preparing a glass-ceramic sealed joint according to the invention.

A hermetic seal was required between a ferritic heat-resisting steel header (material EN 1.4762, CTE $13.5 \times 10^{-6}$ $K^{-1}$ [25-1000° C.]) and a partially stabilized zirconia (Y-PSZ, CTE $11.1 \times 10^{-6}$ $K^{-1}$ [25-1000° C.]) ferrule as part of a CTE transition section in an electrochemical reactor. The arrangement is shown in FIG. 3. In this case, the base of the Y-PSZ ferrule has been blanked off to allow pressure testing after sealing. A disc of sealing material was produced from precursor glass 536 powder by uniaxially pressing in a cylindrical die with the aid of a temporary PVA based binder (Optapix PAF 46, Zschimmer & Schwartz, Lahnstein, Germany). The disc was sintered to more or less full density at 820° C. for 15 minutes (heating and cooling at 3° C./min). A ring 12.1 mm OD×9.7 mm ID×4.0 mm high was machined from the sintered disc of sealant 536. The Y-PSZ ferrule, sintered sealing ring and the ferritic header were stacked as shown in FIG. 3 and were placed inside an alumina jig to maintain alignment. A load of approximately 200 g was applied via an alumina dead-weight to the top of the ferritic header. The assembly, jig and load were transferred to a chamber furnace and the components were sealed by heating at 3° C./min to 1000° C. in air and holding at this temperature for 1 hour. The sealed assembly was cooled to room temperature at 3° C./min or less. Two sealed assemblies are shown in FIG. 3.

The integrity of the seal was tested by internally pressurizing the assembly to 3 bar(g), and monitoring any pressure decay (measurement accuracy 10 mbar). No pressure loss was detected over a period of 24 hours. The sealed assembly was subsequently thermally cycled ten times between room temperature and 1000° C. in air (heating/cooling rate 5° C./min), with pressure decay testing between each cycle. Three seals were tested in this way, and all remained intact, with no detectable leakage in any of the pressure tests.

The invention claimed is:

1. A glass precursor sealing composition comprising:
   (I) 20-40 mol % MgO;
   (II) 14-40 mol % CaO;
   (III) 40-45 mol % $SiO_2$; and
   (IV) 0-0.5 mol % $La_2O_3$;
   wherein the composition is free of $Al_2O_3$ and $B_2O_3$;
   and wherein the total (MgO+CaO) content (mol %) is greater than or equal to the $SiO_2$ content (mol %); and
   the composition further comprises one or more of $ZrO_2$, $TiO_2$, $P_2O_5$, BaO, $Y_2O_3$, or $Nb_2O_5$.

2. A composition according to claim 1 wherein the combined molar content of (MgO+CaO) exceeds the molar content of $SiO_2$ by at least 1 mole %.

3. A composition according to claim 1 wherein the composition comprises 20 to 35 mol % CaO.

4. A composition according to claim 1 having a minimum viscosity (when measured on a sintered disc in accordance with ASTM C1351M-96(2012)) in the range of $10^4$ to $10^7$ Pa·s.

5. A paste, preform or sintered preform comprising a glass precursor sealing composition according to claim 1.

6. A paste, preform or sintered preform as claimed in claim 5 wherein a paste has a powder size of 5-10 µm or wherein the preform or sintered preform is made from a powder having a particle size of 10-100 µm.

7. A preform according to claim 5 which is a tape-cast sheet or is in the form of a ring.

8. A glass-ceramic composition comprising the composition according to claim 1.

9. A glass-ceramic composition according to claim 8 having a CTE of 8.0 to $13.0 \times 10^{-6}$ $K^{-1}$ over the range of 25-1000° C.

10. A glass-ceramic composition produced from a glass precursor sealing composition as claimed in claim 1.

11. A method of forming a seal between a first material and a second material, the method comprising the steps of:
   applying a glass precursor sealing composition as claimed in claim 1;
   heating at a heating rate of 1 to 20° C. per minute to a temperature in the range of 925 to 1150° C.; to seal the first and second materials together to form a joint.

12. A method as claimed in claim 11 wherein the temperature is held at a temperature in range of 925 to 1150° C. for at least 1 hr.

13. A method as claimed in claim 12 wherein after holding, the joint is cooled at a controlled rate of 1 to 10° C. per minute.

14. A method according to claim 11 wherein the first and second materials each have CTE values in the range of $8-13 \times 10^{-6}$ $K^{-1}$ over the range of 25-1000° C.

15. A method according to claim 11 wherein the glass precursor sealing composition is applied in the form of a paste having a powder size of 5-10 µm or wherein the glass precursor sealing composition is a pre-sintered precursor glass preform made from a powder having a particle size of 10-100 µm.

16. A joint comprising the glass-ceramic composition according to claim 8.

17. An electrochemical ceramic membrane reactor comprising at least one joint according to claim 16.

* * * * *